No. 863,883. PATENTED AUG. 20, 1907.
E. SATTLER.
DEVICE FOR RAISING AND LOWERING CUTTER BARS.
APPLICATION FILED APR. 13, 1906.
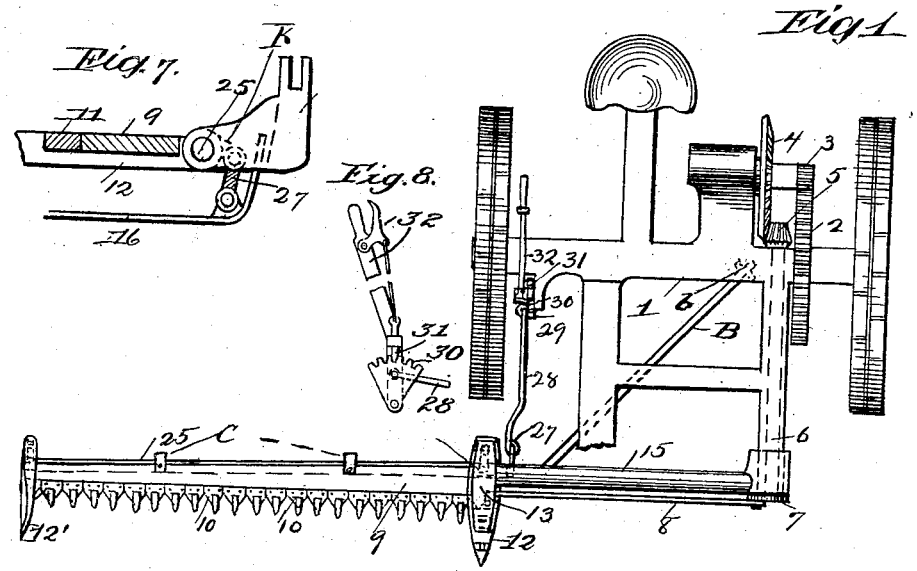
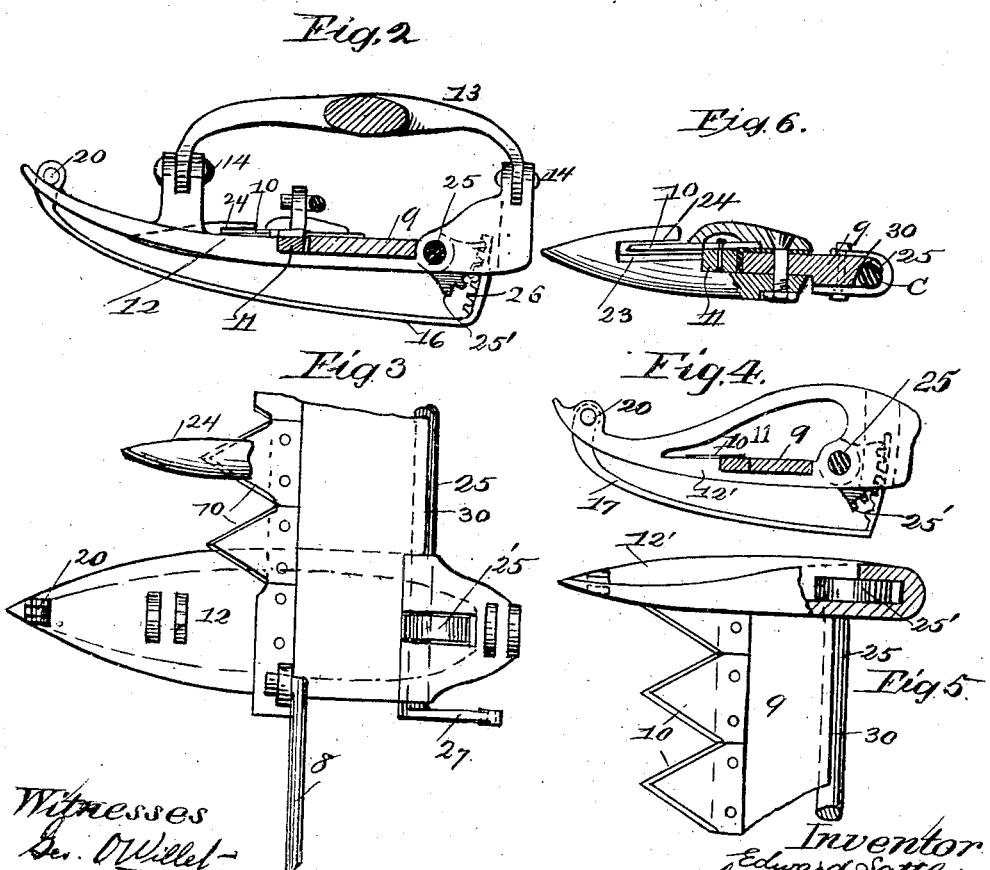
Witnesses
Geo. O. Willet
Lucille Oneill
Inventor
Edward Sattler
by Wm. N. Monroe
Attorney

UNITED STATES PATENT OFFICE.

EDWARD SATTLER, OF MINERAL CITY, OHIO.

DEVICE FOR RAISING AND LOWERING CUTTER-BARS.

No. 863,883.           Specification of Letters Patent.           Patented Aug. 20, 1907.

Application filed April 13, 1906. Serial No. 311,431.

*To all whom it may concern:*

Be it known that I, EDWARD SATTLER, a citizen of the United States, and a resident of Mineral City, county of Tuscarawas, State of Ohio, have invented certain new and useful Improvements in Devices for Raising and Lowering Cutter-Bars, of which I hereby declare the following to be a full, clear, and exact description, such as will enable others skilled in the art to which it appertains to make and use the same.

The objects of the invention are to provide means for raising vertically and simultaneously both of the shoes at the extremities of the cutter bar, or simultaneously, both of the ends of the cutter bar of a mowing machine, or analogous device.

Hitherto the shoes of mowing machines have been provided with a pivotal tilting movement whereby the cutters could be elevated or depressed to a certain extent so as to permit of cutting grain or grass with a long or short stubble. This pivotal and tilting method of construction throws the operating pitman for the cutter bar out of line with the knife, and hence the increased friction and wear require universal bearings and lessen the efficiency and durability of the machine.

A further object of the invention is to so arrange the knives so that they will not rise after repeated use, and so that the resistance of the standing grass will have a tendency to force them down upon the ledger plates.

All machines employing this tilting form of movement must necessarily employ two pivotal joints for the inner shoe, one to permit of vertical adjustment of the cutter bar upon irregular ground and the other to permit of tilting the cutter bar and shoe.

In my form of construction however, I avoid these objectionable features and obtain a simple, rigid and durable device in which the knife bar and shoes rise vertically and in which I omit one of the pivotal joints, that for tilting the cutter bar to raise the knives.

The invention has the various features of construction and combination and arrangement of parts and construction of details as hereinafter described, shown in the accompanying drawings and specifically pointed out in the claims.

In the accompanying drawings, Figure 1 is a plan view of a mower showing the improved manner of constructing the cutter bar supports, and an operating shaft for the sub-shoes; Fig. 2 is an enlarged side view of the inner shoe and sub-shoe showing manner of elevating the shoe; Fig. 3 is a plan view of the same; Fig. 4 is a side elevation of the outer shoe, and Fig. 5 is a plan view thereof; Fig. 6 is a transverse section through the cutter bar and operating shaft for elevating the shoes; Fig. 7 shows a connecting link between a crank on the shaft and the heel of the sub-shoe. Fig. 8 is an elevation of the lever and pawl device for adjusting the height of the cutter bar above the ground.

In these views 1 represents the frame of a mowing machine 2, 3, 4, 5, the operating gears which impart a reciprocating movement to the knives through the medium of the crank shaft 6, crank 7 and connecting rod 8, 9 is the cutter bar upon which the sections 10 and knife back 11 to which the sections are secured is supported, 12 is the inner shoe or transverse pointed bar upon which and upon a similar but smaller shoe 12′ the cutter bar rides. The inner shoe is secured to the yoke 13 by the transversely placed pivotal pins 14, and this yoke is mounted upon the outer end of the swinging drag bar 15. B is the brace bar for the drag bar and is pivoted upon the frame at *b*.

Beneath the inner and outer shoes of the cutter bar are shown sub-shoes 16 and 17 which rest directly upon the ground and which are pointed and upwardly turned in front so as to penetrate the grass or grain readily. These sub-shoes are shown to be pivotally attached to the shoes in front at 20 and the shoes and cutter bar are vertically movable in relation thereto, by suitable adjusting means, so that when the cutter bar is extended horizontally from the machine it will remain level during the adjustment provided for raising and lowering it to provide for a low or high stubble, without tilting or merely raising and lowering the front edge of the bar and the knives.

In practice it has been found that when the knives are upwardly tilted at an angle the pressure of the grass or grain upon them while being cut will have the undesirable effect of forcing them farther and farther away from the ledger plates 23 and will even force them against the guards 24, but if the cutter bar and knives can remain level, or the knives and ledger plates remain in a downwardly tilted position as shown in Fig. 6 the pressure of the grain will tend to force them down upon the ledger plates and thus insure a clean and easy cut.

To avoid tipping or tilting the cutter bar therefor I omit from the construction any longitudinal pivot upon which the bar could tilt in this manner, and employ only the transverse pivoted connection with the drag bar.

To enable the operator to raise the cutter bar vertically, the outer and inner shoes are raised simultaneously upon their sub-shoes by suitable mechanism and I exemplify the idea by means of the devices shown in the figures.

Here 25 is a rock shaft connecting both shoes and pivoted in each, at the rear extremity. This rock shaft is operatively connected with the rear end of the sub-shoe in such a manner that by partially rotating it the rear end thereof can be raised or lowered. In Fig. 2 this object is accomplished by means of a segmental gear 25′ on the shaft and a circular rack 26 upon the sub-shoe. The shaft is rocked by means of the arm 27, rod 28 and crank 29 operated by the ratchet and pawl and lever 30, 31 and 32 accessible to the hand of the driver. The action of this mechanism is to raise and lower the rear end or heel of the sub-shoe which shuts up against the shoe like a knife and thus does not disturb the level of the shoes and cutter bar for the reason that this is held level by the transverse pivot pins which connect the inner shoe with the drag bar. This pivot however readily permits the cutter bar to be raised at the outer end to avoid stumps or obstructions and to be raised to a vertical position when the cutter is not in use. C, C, are clips which pass over the rock shaft 25 and keep it in proper relation to the cutter bar.

Other means may be employed to vertically raise the cutter bar while held in a level position without departing from the spirit of the invention since I believe myself to be the first to provide means operating simultaneously upon a sub-shoe at each end of the cutter bar to raise it vertically when in its extended position, and thus prevent the pressure against the knives while cutting from separating them from the ledger plates as always is the result when the knives are tilted upward.

The device shown in Fig. 7 accomplishes the same result. Here a simple link 27 connects the crank K with the heel of the shoe.

The important feature of the invention is shown to consist in the rock shaft connecting both shoes, and a sub-shoe operatively connected therewith.

In all the figures the rear edge of the cutter bar is shown extending partially over the rock shaft at 30 to prevent it from becoming clogged by the grass or grain.

Having described the invention what I claim as new and desire to secure by Letters Patent is:

1. The combination with a cutter bar and terminal shoes to which it is secured, of a shaft passing through both said shoes, a subshoe underneath each shoe and pivoted thereto at its forward end and instrumentalities operatively connected with said shaft for separating the rear ends of said shoes and subshoes simultaneously to raise said shoes and cutter bar.

2. The combination with a cutter bar having a pointed shoe at each end, of a pointed subshoe pivoted upon each of said shoes at its forward end, a rock shaft passing through both said shoes and operatively connected with the rear ends of said subshoes to tilt the same, means for preventing said cutter bar from tilting transversely consisting of a drag bar transversely pivoted thereto, a knife back adjacent to the cutter bar and forwardly and downwardly inclined knife sections secured to the knife back, substantially as described.

3. In a mowing machine, a drag bar, a cutter bar pivoted thereto by a transverse pivot, shoes underneath the cutter bar one at each end thereof, a subshoe underneath each shoe, and pivoted thereto at its forward end, and means for simultaneously tilting said subshoes to vertically raise said cutter bar, comprising a rock shaft mounted in and connecting said shoes, guiding clips therefor upon the cutter bar, an elevated rear extremity for each subshoe and an operating mechanism connecting said rock shaft and said rear extremities of said subshoes, substantially as described.

4. The combination with a cutter bar, and a transverse bar or shoe at each end thereof, of subshoes underneath said shoes and pivoted to said shoes at the forward ends thereof, a rock shaft connecting said shoes, and operative means connecting with said shaft and the rear extremities of said subshoes arranged to raise and lower both ends of said cutter bar simultaneously and vertically above said subshoes, substantially as described.

5. In a mowing machine, the combination with a cutter bar having a shoe or analogous transverse supporting bar at each end, of a draft bar transversely pivoted to the inner shoe, knives and a knife back upon the cutter bar, guard fingers upon the cutter bar, ledger plates thereon, the said knives and ledger plates being inclined downwardly and forwardly, a longitudinal rock shaft connecting and pivoted in the inner and outer shoes, means for partially rotating said shaft, subshoes located underneath said shoes, and said shoes being vertically movable at their rear ends in relation thereto, the said shaft having operative connection with said subshoes, substantially as described.

6. In a mowing machine having a frame, the combination with a cutter bar, a shoe at each end thereof, a drag bar, pivoted upon the frame, a yoke thereon, transversely arranged pins connecting said yoke and the inner shoe together, a knife back and knife sections mounted upon the cutter bar, means for reciprocating the knife back and sections, a sub-shoe pivoted upon each shoe at the front end thereof, a rock shaft connecting both shoes and having pivotal bearings therein and upon the cutter bar, said shaft being operatively connected with said subshoes at their rear ends, to raise and lower simultaneously the shoes resting thereon, means for operating said shaft accessible to the driver, comprising an arm upon the inner end of the rock shaft, and a lever and ratchet upon the frame, substantially as described.

7. In combination in a mowing machine, having a frame, a drag bar, a cutter bar, outer and inner shoes therefor, the said drag bar transversely pivoted to the inner shoe, a rock shaft connecting and pivoted upon said shoes and cutter bar, a subshoe under each shoe, pivoted to the front end thereof, an operative connection for said shaft with the rear end of each subshoe whereby both shoes can be simultaneously and vertically raised and lowered thereon, consisting of a raised rear extremity for each subshoe, a segmental rack thereon and a segmental gear upon the shaft for each shoe, and an arm upon the inner end of said shaft, a connecting rod and a crank and ratchet wheel and a lever and pawl mounted upon the frame, substantially as described.

8. In a mowing machine, the combination with the cutter bar and terminal shoes, of a longitudinal shaft connecting and pivoted in said shoes, a thin extended edge of the cutter bar over the shaft, a sub-shoe underneath and pivoted to each shoe, operatively connected with said shaft to tilt said sub-shoes relative to the shoes and raise said shoes, a device for operating the shaft, and a knife back and knife sections mounted in said cutter bar for reciprocating movement, substantially as described.

In testimony whereof I hereunto set my hand this 16 day of March, 1906.

EDWARD SATTLER.

Witnesses:
WM. M. MONROE,
LUCILLE O'NEILL.